US008677498B2

(12) United States Patent
Kim et al.

(10) Patent No.: US 8,677,498 B2
(45) Date of Patent: Mar. 18, 2014

(54) APPARATUS AND METHOD OF MANAGING SECURITY DATA

(75) Inventors: Yeo-jin Kim, Suwon-si (KR); Yun-sang Oh, Seoul (KR); Sang-gyoo Sim, Suwon-si (KR); Kyung-im Jung, Seongnam-si (KR); Ji-soo Kim, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1472 days.

(21) Appl. No.: 11/747,983

(22) Filed: May 14, 2007

(65) Prior Publication Data

US 2007/0266260 A1     Nov. 15, 2007

Related U.S. Application Data

(60) Provisional application No. 60/799,652, filed on May 12, 2006.

(30) Foreign Application Priority Data

Apr. 26, 2007  (KR) .......................... 10-2007-0040885

(51) Int. Cl.
*G06F 21/00* (2013.01)
(52) U.S. Cl.
USPC ................................ 726/26; 726/27; 711/100
(58) Field of Classification Search
USPC .................... 726/26, 27; 713/185; 711/100
See application file for complete search history.

(56) References Cited

U.S. PATENT DOCUMENTS

| 6,449,720 | B1* | 9/2002 | Sprague et al. | 713/171 |
| 6,851,043 | B1* | 2/2005 | Inoue | 712/217 |
| 6,868,518 | B2* | 3/2005 | Yuan et al. | 714/759 |
| 6,880,047 | B2* | 4/2005 | Spencer | 711/142 |
| 6,886,127 | B2* | 4/2005 | Yuan | 714/786 |
| 6,912,610 | B2* | 6/2005 | Spencer | 710/240 |
| 6,978,370 | B1* | 12/2005 | Kocher | 713/176 |
| 2002/0019941 | A1* | 2/2002 | Chan et al. | 713/185 |
| 2004/0162932 | A1* | 8/2004 | Mizushima et al. | 711/103 |
| 2005/0005131 | A1 | 1/2005 | Yoshida et al. | |

(Continued)

FOREIGN PATENT DOCUMENTS

| EP | 1039363 B1 | 1/2004 |
| JP | 63-020611 A | 1/1988 |

(Continued)

OTHER PUBLICATIONS

Office Action dated May 25, 2010 issued by the Japanese Patent Office in Japanese application No. 2009-509445.

(Continued)

*Primary Examiner* — Jeffrey Pwu
*Assistant Examiner* — Thong Truong
(74) *Attorney, Agent, or Firm* — Sughrue Mion, PLLC (57) ABSTRACT

An apparatus and method are provided for securely managing security data between a host device and a secure multimedia card. A host device includes an access mode setting unit which sets an access mode for security data that is stored in a secure multimedia card, a transmitting and receiving unit which transmits an access request message that includes the set access mode, and an access information managing unit which receives, if connection between the host device and the secure multimedia card is separated, access information stored in the secure multimedia card, and compares the access information.

13 Claims, 8 Drawing Sheets

(56) References Cited

U.S. PATENT DOCUMENTS

| | | | |
|---|---|---|---|
| 2005/0210212 A1* | 9/2005 | Nagasoe et al. | 711/163 |
| 2006/0156411 A1* | 7/2006 | Saitoh | 726/26 |
| 2006/0195405 A1* | 8/2006 | Miura et al. | 705/65 |
| 2006/0294367 A1 | 12/2006 | Yoshioka | |
| 2007/0259691 A1* | 11/2007 | Santos Garcia | 455/558 |
| 2010/0030961 A9* | 2/2010 | Ma et al. | 711/115 |

FOREIGN PATENT DOCUMENTS

| | | |
|---|---|---|
| JP | 05-324449 A | 12/1993 |
| JP | 11-175402 A | 7/1999 |
| JP | 2002-123806 A | 4/2002 |
| JP | 2005-085011 A | 3/2005 |
| JP | 2005-174200 A | 6/2005 |
| JP | 2005-309779 A | 11/2005 |
| JP | 2005-331331 A | 12/2005 |
| KR | 10-2005-0010889 A | 1/2005 |
| WO | 03/104997 A1 | 12/2003 |

OTHER PUBLICATIONS

Communication from the Japanese Patent Office dated Sep. 21, 2010 in Japanese Patent Application No. 2009-509445.

* cited by examiner

|  | CREATION | READ | WRITE | REMOVE |
|---|---|---|---|---|
| AUTHORIZATION | ∨ |  | ∨ |  |
| STATUS |  |  |  |  |

FIG. 10

|  | CREATION | READ | WRITE | REMOVE |
|---|---|---|---|---|
| AUTHORIZATION | ∨ |  | ∨ |  |
| STATUS | ∨ |  |  |  |

APPARATUS AND METHOD OF MANAGING SECURITY DATA

CROSS-REFERENCE TO RELATED APPLICATIONS

This application claims priority from U.S. Provisional Patent Application No. 60/799,652 filed on May 12, 2006 in the United States Patent and Trademark Office and Korean Patent Application No. 10-2007-0040885 filed on Apr. 26, 2007 in the Korean Intellectual Property Office, the disclosures of which are incorporated herein by reference in their entirety.

BACKGROUND OF THE INVENTION

1. Field of the Invention

Apparatuses and methods consistent with the present invention relate to managing security data, and more particularly, to securely managing security data between a host device and a secure multimedia card.

2. Description of the Related Art

Recently, digital rights management (DRM) has been actively researched and commercial services using DRM have already been implemented or will be implemented. DRM is a technical concept to protect digital content that can be illegally copied and distributed without permission.

Some efforts have been made to protect digital content. Generally, digital content protection has concentrated on preventing those without permission to access digital contents. Specifically, only those people who have paid fees are permitted to access the digital contents, and persons who have not paid the fees are denied access to the digital content. However, the digital contents can be readily copied, reused, processed and distributed to third parties due to the characteristics of the digital data. Accordingly, when a person who has paid the fees accesses the digital content and illegally copies or distributes it to a third party, the third party can use the digital content without paying the fees, which has produced a number of problems.

In order to solve these problems, in DRM, the digital content is encrypted and distributed, and a specified license called a rights object (RO) is needed to use the encrypted digital content.

Figure 1:
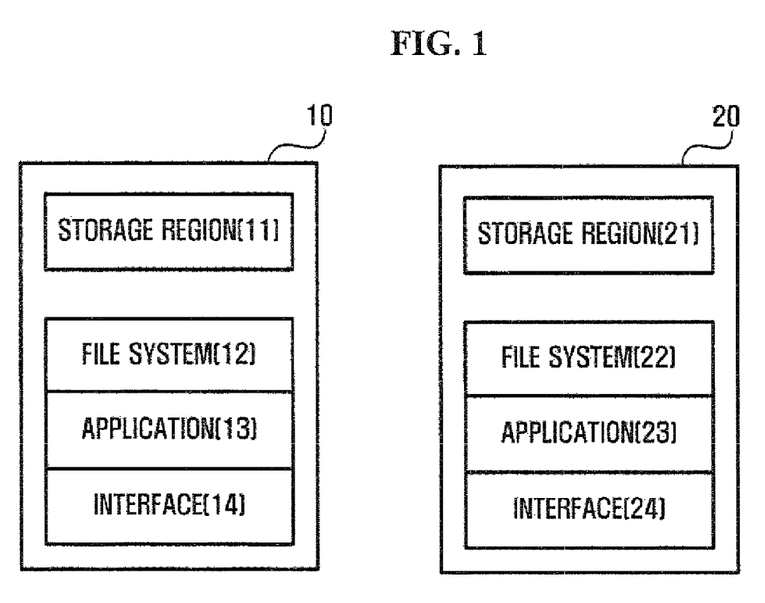
FIG. 1 is a block diagram illustrating a structure of a host device and a secure multimedia card according to the related art.

FIG. 1 is a block diagram illustrating a structure of a host device and a secure multimedia card according to the related art.

As shown in FIG. 1, a host device 10 and a secure multimedia card 20 include connection portions between the host device 10 and the secure multimedia card 20 and enable communication by a physical contact or non-contact device. In a case of communication between peripheral devices, such as the host device 10 and the secure multimedia card 20, the host device 10 and the secure multimedia card 20 include interfaces 14 and 24 that become Universal Serial Bus (USB) ports or card readers, applications 13 and 23 serving as programs through which the host device 10 exchanges information with the secure multimedia card 20 and processes a communication protocol negotiation, file systems 12 and 22, each of which accesses a storage region of each device and manages the storage region such that a file or a directory can be read and written in the storage region, and storage regions 11 and 21, each of which is a physical region for storing data in each device and accesses the file system.

In this case, the host device 10 communicates with the secure multimedia card 20 to move security data, and transmits the security data to the secure multimedia card 20 or requests the secure multimedia card 20 to read the security data.

Further, the secure multimedia card 20 communicates with the host device 10 to move the security data, and receives or transmits the security data according to the request of the host device 10.

For reference, it is assumed that the security data used in exemplary embodiments of the present invention exists in types of files.

Figure 2:
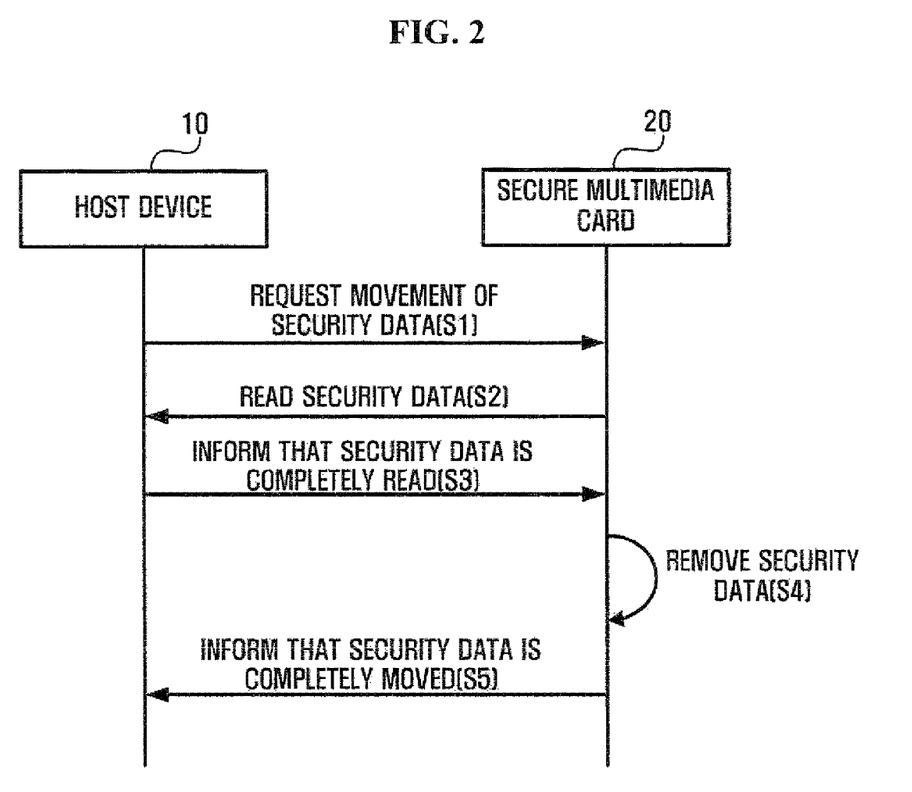
FIG. 2 is a flowchart illustrating a process of moving security data in a host device and a secure multimedia card according to the related art.

FIG. 2 is a flowchart illustrating a process of moving security data in a host device and a secure multimedia card according to the related art.

First, the host device 110 requests the secure multimedia card 20 to move (that is, read) the security data (S1). Then, the host device 10 reads the security data from the secure multimedia card 20 (S2), and stores the read security data in a storage space of the host device 10.

Then, the host device 10 transmits to the secure multimedia card 20, a signal informing that the security data is successfully stored (S3). Then, the secure multimedia card 20 deletes original security data (S4), and transmits to the host device 10, a signal informing that the movement of the security data is completed (S5).

As described above with reference to FIG. 2, in the DRM, when the security data is moved between two different devices, the security data should not exist in both of the two devices. In order to protect a right of a user, the security data should not get lost.

However, when connection between the host device 10 and the secure multimedia card 20 is separated while the host device 10 reads the security data in operation S2 of FIG. 2, the following problems may occur. That is, damaged security data is stored in the host device 10, and the secure multimedia card 20 removes the corresponding security data. As a result, the security data may not exist (that is, be lost) in both of the two devices.

Further, in the case where connection between the host device 10 and the secure multimedia card 20 is separated before the host device 10 completes movement of the corresponding security data and then informs the secure multimedia card 20 that movement of the corresponding security data is completed in operation S3 of FIG. 2, the secure multimedia card 20 does not know when the secure multimedia card 20 has removed a corresponding file. As a result, the same security data may exist (that is, be illegally copied) in both the host device 10 and the secure multimedia card 20.

Furthermore, when the two devices 10 and 20, of which the connection is not separated normally, are connected to each other again, it is not possible to confirm a current status of the corresponding security data, thereby not allowing an appropriate action to be taken in order to resolve the problems.

SUMMARY OF THE INVENTION

The present invention provides an apparatus and method of securely managing security data that is capable of preventing the security data from being lost and illegally copied between a host device and a secure multimedia card.

According to a first aspect of the present invention, there is provided a host device, the host device including an access mode setting unit setting an access mode for security data that is stored in a secure multimedia card, a transmitting and receiving unit transmitting an access request message that includes the set access mode, and an access information managing unit receiving, when connection between the host device and the secure multimedia card is separated, access information stored in the secure multimedia card, and comparing the checked access information.

According to a second aspect of the present invention, there is provided a secure multimedia card, the secure multimedia card including an access mode checking unit confirming an access mode received from a host device so as to check an authorization bit for the access mode, and checking a status bit for the access mode on the basis of a command message received from the host device and a storage unit storing the authorization bit and the status bit for the access mode.

According to a third aspect of the present invention, there is provided an apparatus for managing security data, the apparatus including a host device setting an access mode for security data that is stored in a secure multimedia card and transmitting an access request message including the set access mode, and the host multimedia card confirming the access mode received from the host device so as to check an authorization bit for the access mode, and checking a status bit for the access mode on the basis of a command message received from the host device.

According to a fourth aspect of the present invention, there is provided a method of managing security data, the method including setting an access mode for security data that is stored in a secure multimedia card, transmitting an access request message including the set access mode and accessing the security data, performing an operation according to the access mode, and transmitting an operation completion message when the operation is completed.

According to a fifth aspect of the present invention, there is provided a method of managing security data, the method including confirming an access mode received from a host device so as to check an authorization bit for the access mode, and checking a status bit for the access mode when the host device performs an operation according to the access mode and transmits a message informing that the operation is completed.

BRIEF DESCRIPTION OF THE DRAWINGS

The above and other aspects of the present invention will become more apparent by describing in detail exemplary embodiments thereof with reference to the attached drawings in which.

DESCRIPTION OF THE EXEMPLARY EMBODIMENTS

Advantages and features of the present invention and methods of accomplishing the same may be understood more readily by reference to the following detailed description of exemplary embodiments and the accompanying drawings. The present invention may, however, be embodied in many different forms and should not be construed as being limited to the exemplary embodiments set forth herein. Rather, these exemplary embodiments are provided so that this disclosure will be thorough and complete and will fully convey the concept of the present invention to those skilled in the art, and the present invention will only be defined by the appended claims. Like identification codes refer to like elements throughout the specification.

The present invention will now be described more fully with reference to the accompanying drawings, in which exemplary embodiments of the invention are shown.

Figure 3:
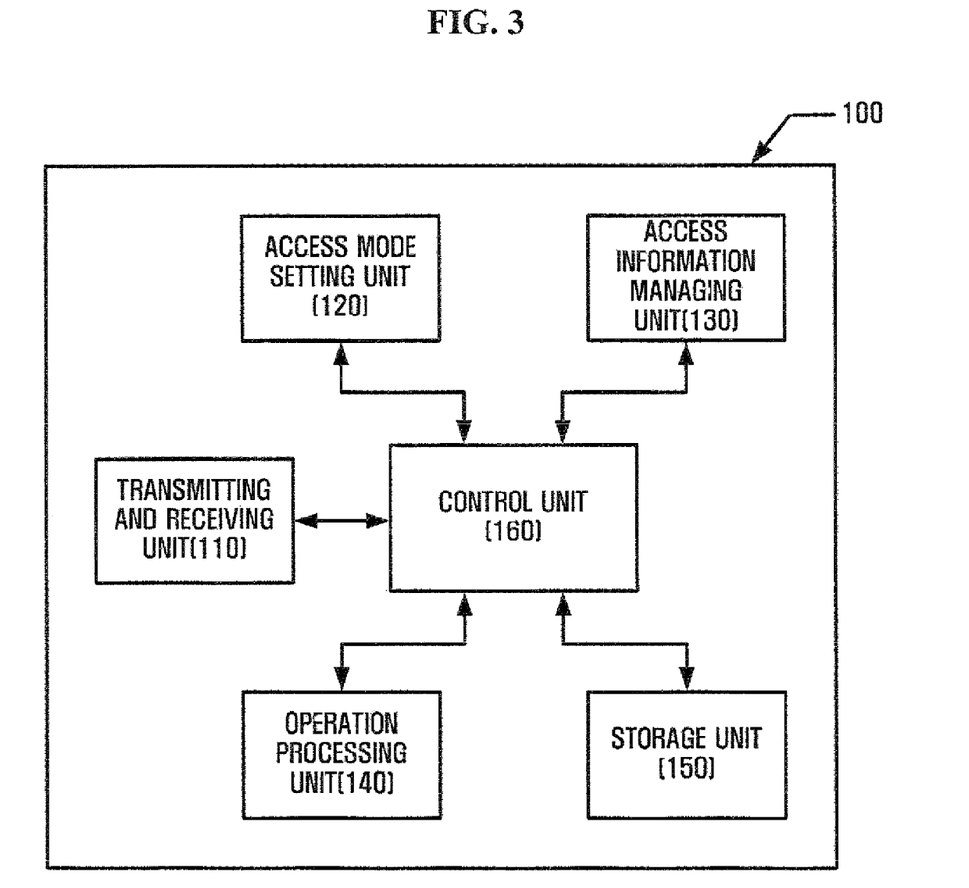
FIG. 3 is a block diagram illustrating an inner structure of a host device according to an exemplary embodiment of the present invention.

FIG. 3 is a block diagram illustrating an inner structure of a host device according to an exemplary embodiment of the present invention.

As shown in FIG. 3, a host device 100 includes a transmitting and receiving unit 110, an access mode setting unit 120, an access information managing unit 130, an operation processing unit 140, a storage unit 150, and a control unit 160.

The term "units" used in this exemplary embodiment and the following exemplary embodiments mean software, or a hardware component such as a Field Programmable Gate Array (FPGA) or an Application Specific Integrated Circuit (ASIC) and the "units" each performs assigned functions. However, the "units" are not limited to software or hardware. The "units" may be configured in an addressable storage medium, or may be configured to run on at least one processor.

Therefore, as an example, the "units" include: components such as software components, object-oriented software components, class components, and task components; processors, functions, attributes, procedures, sub-routines, segments of program codes, drivers, firmware, microcodes, circuits, data, databases, data structures, tables, arrays, and variables. The functions provided by the components and the "units" may be combined into fewer components and/or "units" or may be separated into additional components and "units".

The transmitting and receiving unit 110 transmits to the secure multimedia card, a message requesting to access security data, a message requesting to copy (that is, read) the security data, a message informing that the security data is completely copied, and a message requesting to remove the security data. Further, the transmitting and receiving unit 110 receives a message informing that the security data is completely removed from the secure multimedia card.

The access mode setting unit 120 sets a mode (that is, access mode) that accesses the security data that is stored in the secure multimedia card. In this case, the access mode setting unit 120 sets an authorization bit of the access mode. Further, examples of the access mode include a creation mode, a read mode, a write mode, and a remove mode, each of which is composed of authorization and status bits.

The access information managing unit 130 manages access information that is stored in the secure multimedia card. In this case, the access information means information that is associated with an authorization bit for an access mode set by the access mode setting unit 120 and a status bit checked by the secure multimedia card. Hereinafter, the access information will be described in more detail with reference to FIG. 5.

For example, the access information managing unit 130 checks whether both of authorization and status bits of an access mode are checked. As the checked result, when only the authorization bit is checked, the access information managing unit 130 determines that the checking operation on the corresponding authorization bit is not performed, and requests to perform the checking operation on the authorization bit again.

The operation processing unit 140 processes an operation, such as creation, read, write, remove, or the like, on the security data. Further, when an operation is completed, the operation processing unit 140 creates a message informing that the corresponding operation is completed.

For example, when the access mode setting unit 120 sets a read mode of the security data, the operation processing unit 140 performs a read operation on the security data that is stored in the secure multimedia card. In this case, if the read operation of the security data is completed, the operation processing unit 140 causes the transmitting and receiving unit 110 to transmit a message informing that the read operation of the security data is completed to the secure multimedia card.

The storage unit 150 stores the security data.

The control unit 160 controls operations of the units 110 to 150 that constitute the host device 100.

Figure 4:
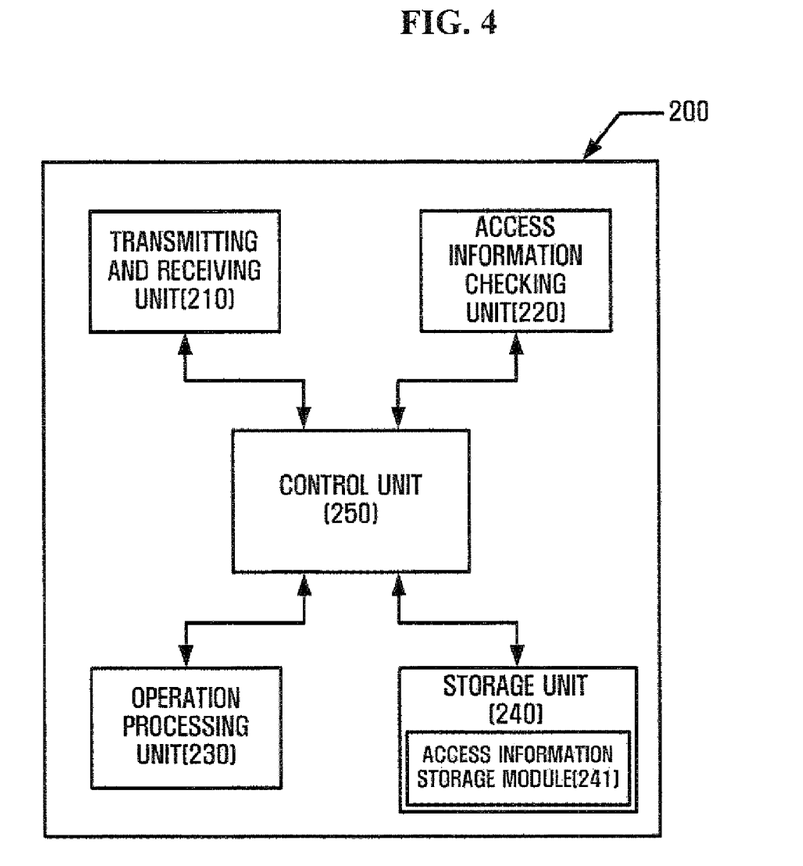
FIG. 4 is a block diagram illustrating an inner structure of a secure multimedia card according to an exemplary embodiment of the present invention.

FIG. 4 is a block diagram illustrating an inner structure of a secure multimedia card according to an exemplary embodiment of the present invention.

As shown in FIG. 4, a secure multimedia card 200 includes a transmitting and receiving unit 210, an access information checking unit 220, an operation processing unit 230, a storage unit 240, and a control unit 250.

The transmitting and receiving unit 210 transmits to the host device 100, a signal informing that a remove operation of the security data is completed. Further, the transmitting and receiving unit 210 receives from the host device 100, a message requesting to access the security data, a message requesting to copy (that is, read) the security data, a message informing that the security data is completely copied, and a message requesting to remove the security data.

The access information checking unit 220 confirms access modes that are included in the message requesting to access the security data that has been received from the host device 100, and checks an authorization bit for the confirmed access modes.

For example, when the confirmed access modes are "read and remove" modes, the access information checking unit 220 checks authorization bits for the "read" and "remove" modes. In this case, to check the authorization bits means that the authorization bits are converted from 0 to 1.

Further, the access information checking unit 220 checks status bits for the access modes on the basis of the messages that have been received from the host device 100. In this case, the received messages include a message informing that an operation of a predetermined access mode is completed and a message that requests to complete the operation of the predetermined access mode.

For example, when the security data read completion message is received from the host device 100, the access information checking unit 220 checks a status bit of the "read" mode, and when the message requesting to remove the security data is received, the access information checking unit 220 checks a status bit of the "remove" mode.

The operation processing unit 230 processes an operation, such as creation, read, write, remove, or the like, on the security data.

For example, when the message requesting to remove the security data is received from the host device 100, the operation processing unit 230 removes (deletes) the security data that is stored in the secure multimedia card 200. In this case, when the security data is removed, the access information checking unit 220 checks a status bit of the "remove" mode.

The storage unit 240 stores the security data, and includes an access information storage module 241 that separately stores access information.

The access information storage module 241 stores the access mode set by the host device 100 and authorization and status bits for the access mode. In this case, the authorization and status bits for the access mode are stored in a form of a table. However, the authorization and status bits for the access mode are not necessarily stored in the form of the table.

The control unit 250 controls operations of functional blocks 210 to 240 that constitute the secure multimedia card 200.

Figure 5:
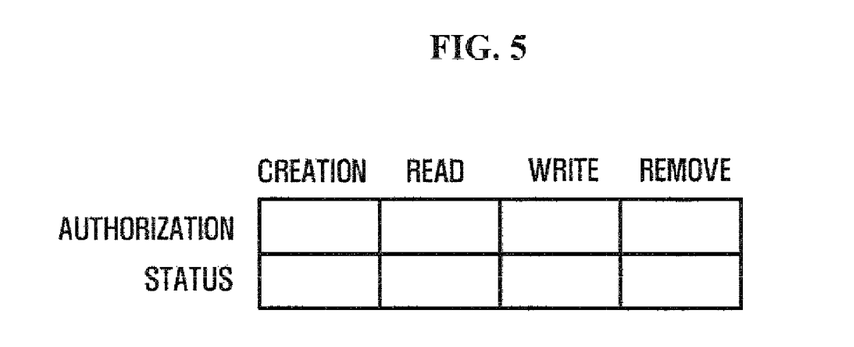
FIG. 5 is a diagram illustrating access information that is stored in an access information storage module of a secure multimedia card according to an exemplary embodiment of the present invention.

FIG. 5 is a diagram illustrating access information that is stored in an access information storage module of a secure multimedia card according to an exemplary embodiment of the present invention.

As shown in FIG. 5, examples of the access mode include creation, read, write, and remove modes, each of which is composed of authorization and status bits.

The creation mode means a mode in which new security data is created. The read mode means a mode in which the host device 100 reads the security data stored in the secure multimedia card 200. The write mode means a mode in which the security data stored in the host device 100 moves to the secure multimedia card 200. The remove mode means a mode in which the stored security data is removed (deleted).

Further, the authorization bit indicates that a predetermined operation is performed on the security data, and the status bit indicates that the predetermined operation is completely performed.

That is, when the host device 100 first accesses the security data, the authorization bit is checked, and when the process of the security data is completed as the authorization bit is checked, the status bit is checked.

For example, when the "read" and "remove" modes are set in the host device 100, the access information checking unit 220 of the secure multimedia card 200 checks the authorization bits for the "read" and "remove" modes.

Then, when the read operation of the security data is completed, the access information checking unit 220 checks a status bit for the "read" mode, and when the message requesting to remove the security data is received from the host device 100, the access information checking unit 220 checks the status bit for the "remove" mode. Accordingly, the host device 100 compares authorization and status bits that are access information stored in the secure multimedia card 200, thereby discovering and resolving problems that occur between the host device 100 and the secure multimedia card 200.

Figure 6:
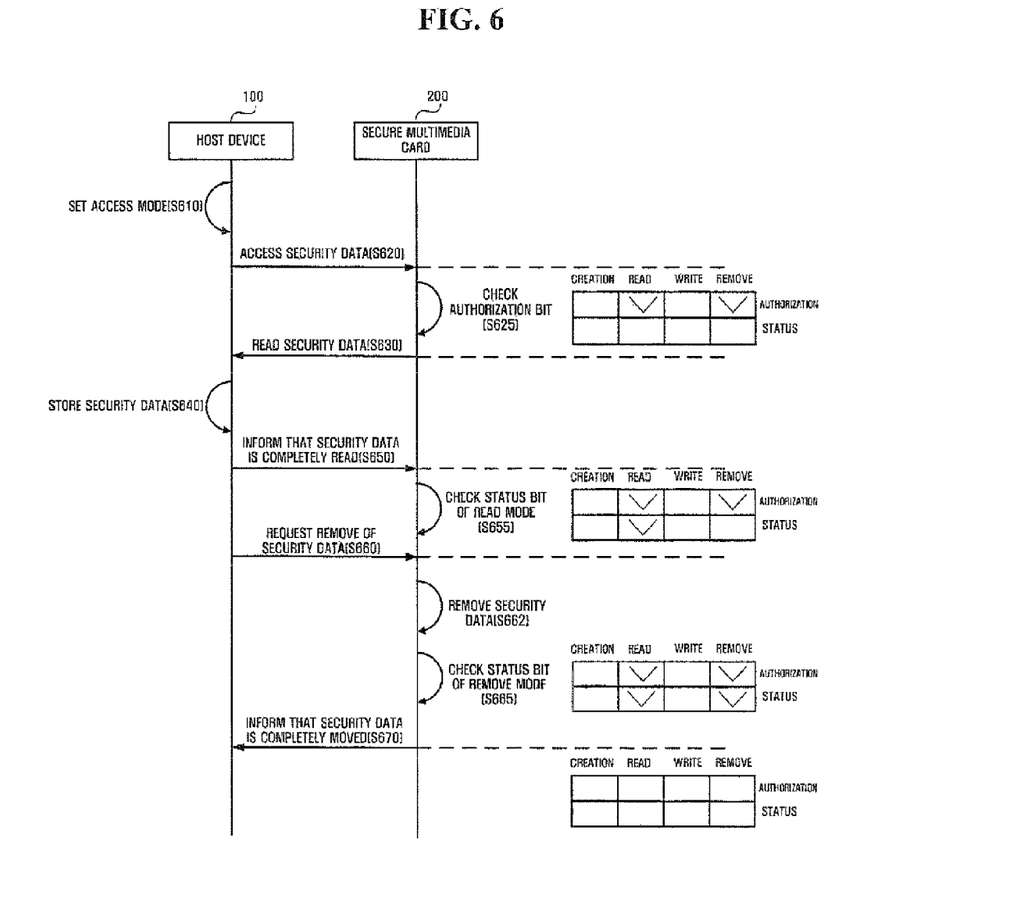
FIG. 6 is a flowchart illustrating a method of managing security data according to an exemplary embodiment of the present invention.

FIG. 6 is a flowchart illustrating a method of managing security data according to an exemplary embodiment of the present invention. In this case, the description is given to an operation in which the host device 100 moves the security data stored in the secure multimedia card 200 to the host device 100.

First, the host device 100 sets access modes (for example, a read mode and a remove mode) for the security data (S610). Then, the host device 100 transmits a message requesting to access the security data including the access modes to the secure multimedia card 200, and accesses the security data (S620).

Then, the secure multimedia card 200 receives the transmitted message. Then, the secure multimedia card 200 confirms the access modes that are included in the received message, and checks authorization bits for the confirmed access modes (S625).

Then, the host device 100 reads the security data that is stored in the secure multimedia card 200 (S630), and stores the security data in a storage space of the host device 100 (S640).

Then, the host device 100 transmits to the secure multimedia card 200, a message informing that the security data is successfully stored (S650). Then, the secure multimedia card 200 checks a status bit for the "read" mode (S655).

Then, the host device 100 transmits a message requesting to remove the corresponding security data to the secure multimedia card 200 (S660). Then, the secure multimedia card 200 removes (deletes) original security data (S662), and checks a status bit for the "remove" mode (S665).

Then, the secure multimedia card 200 transmits to the host device 100, a message informing that the security data is completely moved (S670). Then, the checked access mode and the checked authorization and status bits for the access mode are initialized.

Figure 7:
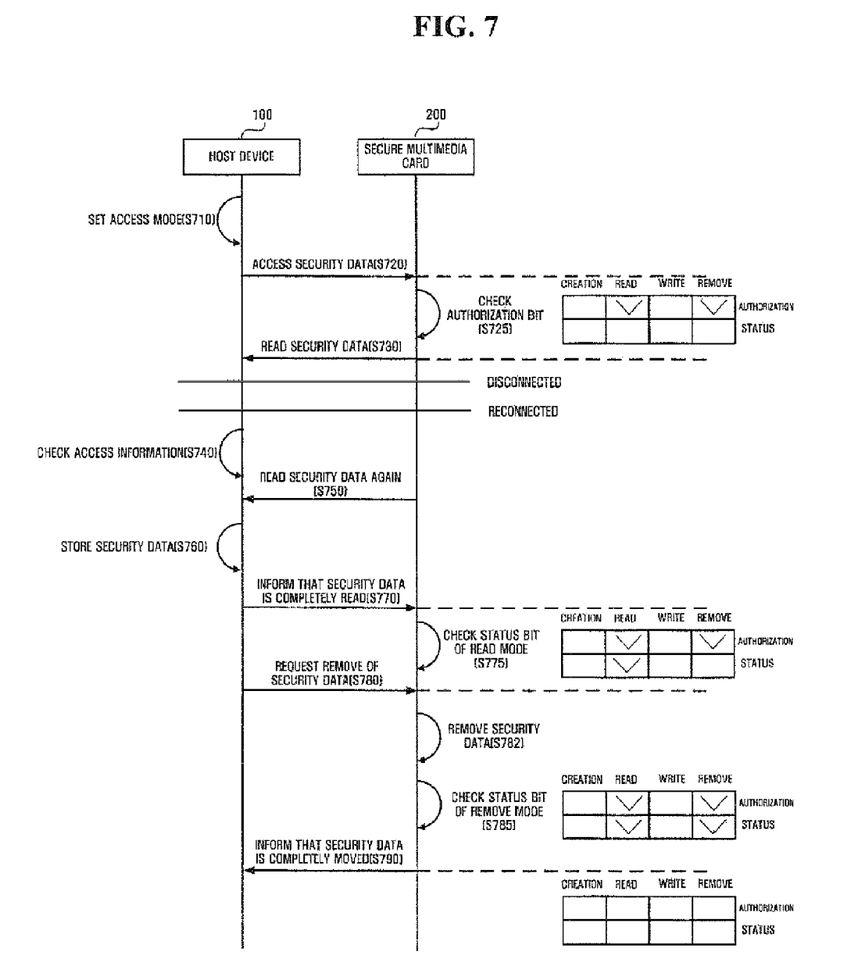
FIG. 7 is a flowchart illustrating a process of preventing security data from being lost in a method of managing security data according to an exemplary embodiment of the present invention.

FIG. 7 is a flowchart illustrating a process of preventing security data from being lost in a method of managing security data according to an exemplary embodiment of the present invention. In this case, the description is given to a process of preventing the security data from being lost when connection between the host device and the secure multimedia card is separated during a copying process of the security data.

First, the host device 100 sets access modes (for example, a read mode and a remove mode) for the security data (S710). Then, the host device 100 transmits a message requesting to access the security data including the access modes to the secure multimedia card 200, and accesses the security data (S720).

Then, the secure multimedia card 200 receives the transmitted message. Then, the secure multimedia card 200 confirms the access modes that are included in the received message, and checks authorization bits for the confirmed access modes (S725).

Then, the host device 100 reads the security data that is stored in the secure multimedia card 200 (S730). At this time, connection between the host device 100 and the secure multimedia card 200 is separated. In this case, since the read operation of the security data is not normally completed, the secure multimedia card 200 does not check a status bit for the "read" mode.

Then, if the host device 100 and the secure multimedia card 200 are reconnected, the host device 100 requests the secure multimedia card 200 to transmit access information, and checks authorization and status bits in the received access information (S740).

As the checked result, in the case where the authorization bits for the "read" mode and the "remove" mode of the corresponding security data are displayed but the status bits for the "read" mode and the "remove" mode are not checked, the read operation of the security data is performed again (S750). In this case, when the status bit of the read mode is not checked, it can be assumed that the host device 100 fails to read the security data. For this reason, the read operation of the security data is performed again. Then, the host device 100 stores the read security data in a storage space (S760).

Then, operations S770 to S790 are performed in the same manner as operations S650 to S670 shown in FIG. 6.

Figure 8:
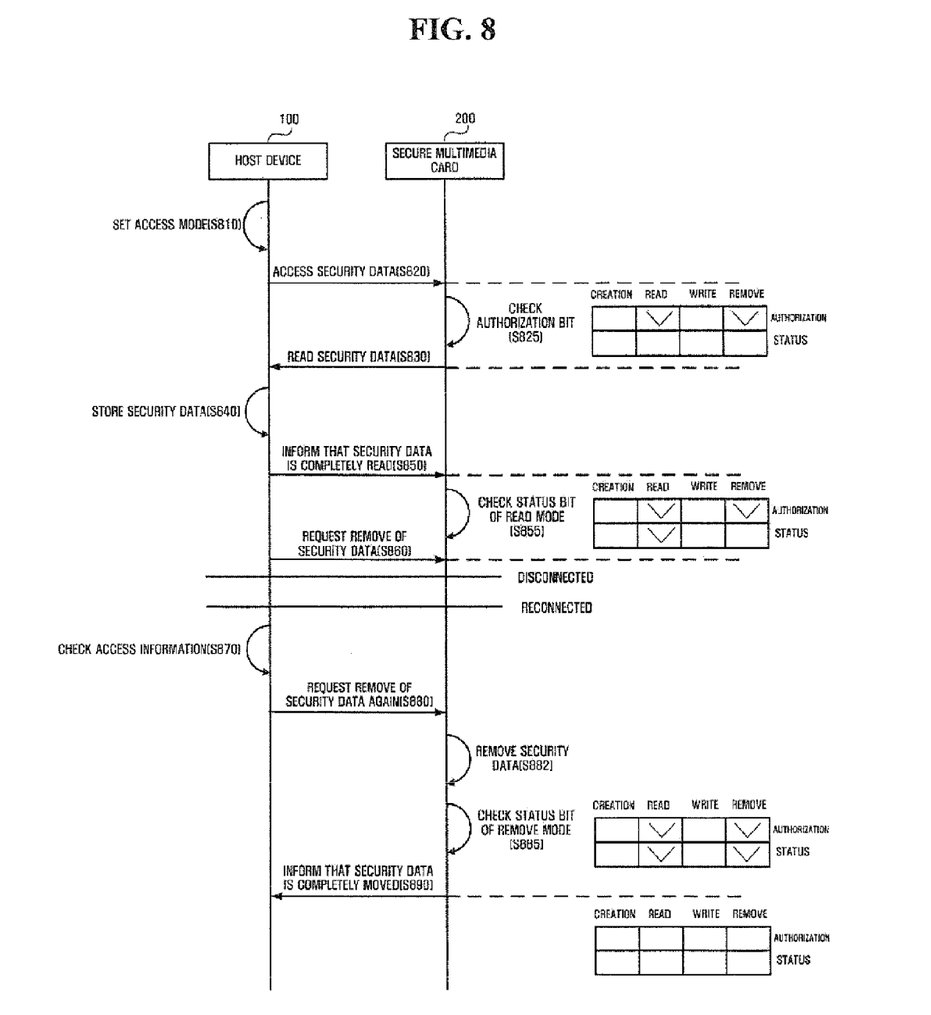
FIG. 8 is a flowchart illustrating a process of preventing security data from being illegally copied in a method of managing security data according to an exemplary embodiment of the present invention.

FIG. 8 is a flowchart illustrating a process of preventing security data from being illegally copied in a method of managing security data according to an exemplary embodiment of the present invention. In this case, the description is given to a process of preventing the security data from being illegally copied when connection between the host device and the secure multimedia card is separated during a remove process of the security data.

Operations S810 to S855 are performed in the same manner as operations S610 to S655 shown in FIG. 6.

Then, the host device 100 transmits a message requesting to remove the corresponding security data to the secure multimedia card 200 (S860). At this time, connection between the host device 100 and the secure multimedia card 200 is separated. In this case, since the remove operation of the security data is not normally completed, the secure multimedia card 200 does not check the status bit for the "remove" mode.

Then, if the host device 100 and the secure multimedia card 200 are reconnected, the host device 100 requests the secure multimedia card 200 to transmit access information, and checks authorization and status bits in the received access information (S870).

As the checked result, in the case where the authorization bits for the "read" mode and the "remove" mode of the corresponding security data and the status bit for the "read" mode are displayed but the status bit for the "remove" mode is not checked, the remove operation of the security data is requested again (S880). In this case, when the status bit of the remove mode is not checked, it can be determined that the security data stored in the secure multimedia card 200 is not removed. For this reason, the remove operation of the security data is requested again.

Therefore, the secure multimedia card 200 removes (deletes) original security data (S882), and checks the status bit for the "remove" mode (S885).

Then, the secure multimedia card 200 transmits to the host device 100, a message informing that the security data is completely moved (S890). Then, the checked access mode and the checked authorization and status bits for the access mode are initialized.

Figure 9:
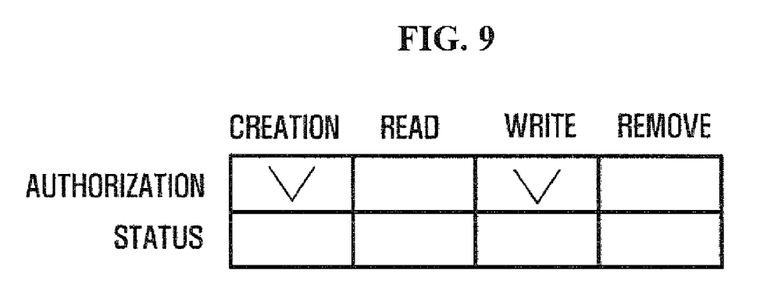
FIGS. 9 and 10 are diagrams illustrating problems that occur while security data is moved from a host device to a secure multimedia card according to another exemplary embodiment of the present invention.
Figure 10:
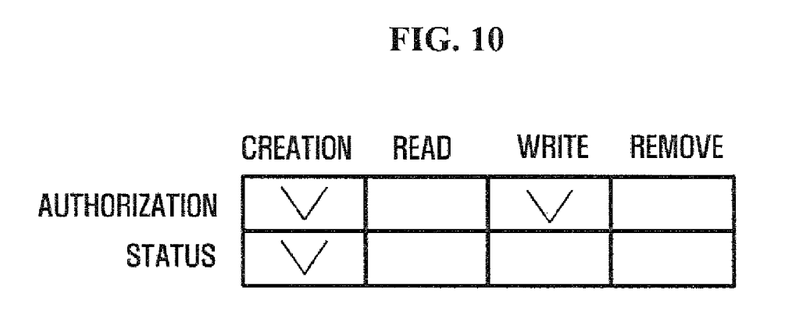

FIGS. 9 and 10 are diagrams illustrating problems that occur while security data is moved from a host device according to another exemplary embodiment of the present invention to a secure multimedia card.

As shown in FIG. 9, in the case where only authorization bits for a creation mode and a write mode are checked but status bit for the creation mode and the write mode are not checked, it can be determined that a problem occurs while the host device 100 accesses the security data in order to write the security data in the secure multimedia card 200. Therefore, the host device 100 reserves transmission of the security data until the problem occurring at the time of creating the security data in the secure multimedia card 200 is resolved.

As shown in FIG. 10, in the case where authorization bits for the creation mode and the write mode and a status bit for the creation mode are checked but the status bit for the write mode is not checked, it can be determined that a problem occurs while the security data is moved from the host device 100 to the secure multimedia card 200. As a result, when the host device 100 determines that all the security data is transmitted and removes the security data, the security data is lost. Accordingly, in the case where the status bit for the write mode is not checked, the host device 100 determines that the host device 100 fails to write the security data, and performs the write operation of the security data again.

According to objects of managing the security data, authorization and status bits for various access modes may be combined and used, and proper restoration may be made according to a combination of authorization and status bits.

Although the present invention has been described in connection with the exemplary embodiments of the present invention, it will be apparent to those skilled in the art that various modifications and changes may be made thereto without departing from the scope and spirit of the present invention. Therefore, it should be understood that the above exemplary embodiments are not limitative, but illustrative in all aspects.

According to the apparatus and method of managing security data according to the exemplary embodiments of the present invention, the following effects may be achieved.

Since the host device can check access information of the secure multimedia card and determine a status of the corresponding security data, the host device can perform a proper process according to the status of the security data when a problem occurs.

Further, since the security data can be prevented from being lost and illegally copied, stability of the security data can be ensured.

Furthermore, even though the secure multimedia card serving as a storage device having low performance does not have a complex file system, the host device can manage the security data that is stored in the secure multimedia card.

What is claimed is:

1. A host device comprising:
an access mode setting unit which sets an access mode for security data that is stored in a secure multimedia card;
a transmitting and receiving unit which transmits an access request message that comprises the set access mode; and
an access information managing unit which receives, if a process is abnormally terminated, access information stored in the secure multimedia card, and checks an authorization bit and a status bit for the set access mode in the received access information, and if the status bit for the set access mode is not checked, performs the process again,
wherein the access mode comprises a plurality of modes, and the access information comprises a plurality of authorization bits and a plurality of status bits, so that each mode of the plurality of modes has an authorization bit and a status bit respectively, and
wherein the access information managing unit checks an authorization bit and a status bit for each mode in the received access information, and if only authorization bit is checked for a specific mode, the access information managing unit determines to perform the operation of the specific mode that is not completed.

2. The host device of claim 1, wherein the access mode comprises a creation mode, a read mode, a write mode, and a remove mode.

3. The host device of claim 1, wherein:
the access information managing unit compares a first authorization bit, from among the plurality of authorization bits, with a first status bit, from among the plurality of status bits, and compares a second authorization bit, from among the plurality of authorization bits, with a second status bit, from among the plurality of status bits; and
the first authorization bit and the first status bit correspond to a first mode, from among the plurality of modes, and the second authorization bit and the second status bit correspond to a second mode, from among the plurality of modes, different from the first mode.

4. A secure multimedia card comprising:
an access mode checking unit which confirms an access mode comprising a plurality of modes received from a host device so as to check a plurality of authorization bits for the plurality of modes of the access mode, and checks a plurality of status bits for the plurality of modes of the access mode based on a command message received from the host device; and
a storage unit which stores the authorization bit and the status bit for the access mode,
wherein the access mode checking unit does not check the plurality of status bits if the process is abnormally terminated, and checks completion of a predetermined operation for each mode of the access mode by comparing the plurality of authorization bits with the plurality of status bits for the plurality of modes of the access mode.

5. The secure multimedia card of claim 4, wherein the access mode comprises a creation mode, a read mode, a write mode, and a remove mode.

6. An apparatus for managing security data, the apparatus comprising:
a host device which sets an access mode comprising a plurality of modes for security data that is stored in a secure multimedia card and transmits an access request message comprising the set access mode; and
the secure multimedia card which confirms the access mode received from the host device to check a plurality of authorization bits for the plurality of modes of the access mode, and checks a plurality of status bits for the plurality of modes of the access mode based on a command message received from the host device,
wherein the host device comprises:
an access mode setting unit which sets the access mode for the security data that is stored in the secure multimedia card;
a transmitting and receiving unit which transmits the access request message comprising the set access mode; and
an access information managing unit which receives, if a process is abnormally terminated, access information stored in the secure multimedia card, and checks an authorization bit and a status bit for mode, among the plurality of access modes, in the received access information, and only if the authorization bit is checked for a specific mode, the access information managing unit determines to perform the operation of the specific mode that is not completed,
wherein the access information comprises the plurality of authorization bits, so that each mode of the plurality of modes has an authorization bit and a status bit respectively.

7. The apparatus of claim 6, wherein the secure multimedia card comprises:
an access mode checking unit which confirms the access mode received from the host device to check the plurality of authorization bits for the plurality of modes the access mode, and checks the plurality of status bits for the plurality of modes of the access mode based on the command message received from the host device; and a storage unit which stores the plurality of authorization bits and the plurality of status bits for the access mode.

8. The apparatus of claim 6, wherein the access mode comprises a creation mode, a read mode, a write mode, and a remove mode.

9. A method of managing security data, the method comprising:

setting an access mode for security data that is stored in a secure multimedia card;

transmitting an access request message comprising the set access mode;

accessing the security data;

performing an operation according to the access mode;

transmitting an operation completion message if the operation is completed; and receiving, if a process is abnormally terminated, access information stored in the secure multimedia card and checking an authorization bit and a status bit for the set access mode in the received access information, and if the status bit for the set access mode is not checked, performing the process again, wherein the access information comprises a plurality of authorization bits and a plurality of status bits, so that each mode of a plurality of modes has an authorization bit and a status bit respectively, and wherein the receiving comprises checking an authorization bit and a status bit of a mode, among the plurality of modes, in the received access information, and, only if the authorization bit is checked for a specific mode, the access information managing unit determines to perform the operation of the specific mode that is not completed.

10. The method of claim 9, wherein the access mode comprises a creation mode, a read mode, a write mode, and a remove mode.

11. A method of managing security data, the method comprising:

confirming an access mode comprising a plurality of modes received from a host device to check a plurality of authorization bits for the plurality of modes of the access mode; and checking a plurality of status bits for the plurality of modes of the access mode if the host device performs an operation according to the access mode and transmits a message informing that the operation is completed, wherein the checking the plurality of status bits for the plurality of modes of the access mode comprises not checking the plurality of status bits if the process is abnormally terminated, and checking completion of a predetermined operation for each mode of the access mode by comparing the plurality of authorization bits with the plurality of status bits for the plurality of modes of the access mode.

12. The method of claim 11, wherein the access mode comprises a creation mode, a read mode, a write mode, and a remove mode.

13. The method of claim 11, wherein the authorization bit and the status bit for the access mode are stored in a separate storage space.

* * * * *